March 2, 1926.  1,574,822
F. J. KOCH
TROLLEY PARKING GARAGE FOR MOTOR VEHICLES
Filed June 15, 1925   2 Sheets-Sheet 1

Frederick J. Koch,
INVENTOR
BY
ATTORNEY

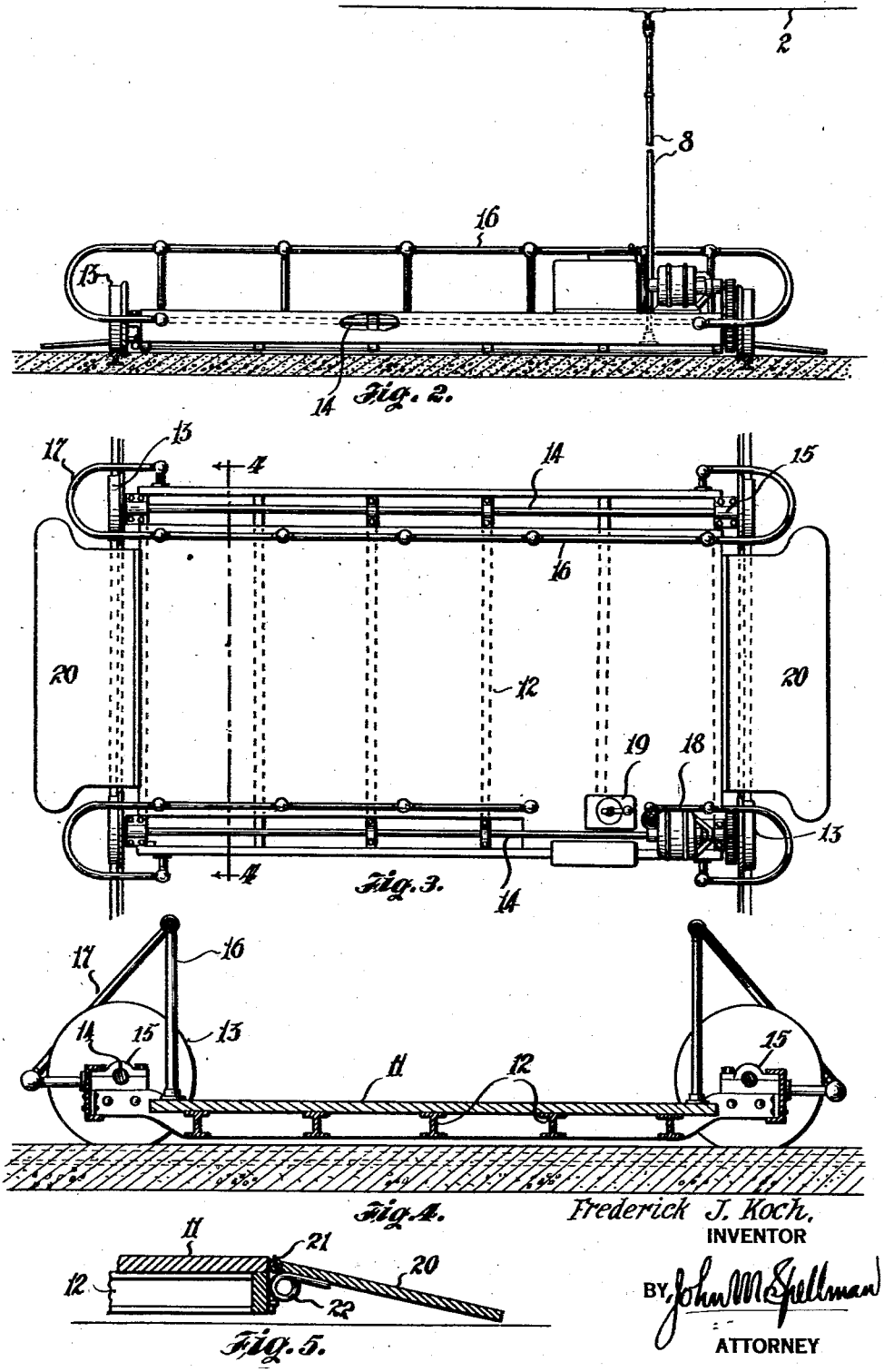

Patented Mar. 2, 1926.

1,574,822

UNITED STATES PATENT OFFICE.

FREDERICK J. KOCH, OF DALLAS, TEXAS.

TROLLEY PARKING GARAGE FOR MOTOR VEHICLES.

Application filed June 15, 1925. Serial No. 37,406.

*To all whom it may concern:*

Be it known that I, FREDERICK J. KOCH, a citizen of the United States, residing at Dallas, in the county of Dallas and State of Texas, have invented certain new and useful Improvements in Trolley Parking Garages for Motor Vehicles, of which the following is a specification.

This invention relates to improvements in means for parking motor vehicles and in such connection it relates more particularly to the novel and practical arrangement thereof.

The primary object of the invention is to provide an arrangement of parking spaces in a building to diminish the delay experienced in such places in receiving a vehicle from and delivering it to its owner.

The inventor is aware that various arrangements and means for effecting this result have been patented and are in use, but so far as he is aware the present invention offers an important improvement over such means and apparatus in that the vehicles may be received into the building and delivered therefrom to the owner with a minimum of time and labor.

The present invention provides a parking arrangement which utilizes an electric trolley system with a truck for quickly moving the vehicles to and from the building, and also provides in connection with such trolley system an arrangement of the vehicle parking or stall spaces which provide easy access for the vehicle, in connection with a plurality of elevators for several floors, also turn-tables for heading the vehicles quickly in the desired direction.

With the above and other objects in view, the invention will be better understood by reference to the following detailed description, taken in connection with the accompanying drawings, forming part hereof, and in which:

Figure 2 is a front elevational view of a trolley truck and a cross-sectional view of the concrete flooring showing the tracks embedded therein.

Figure 3 is a top or plan view of the trolley truck.

Figure 4 is a cross-sectional view of the truck, taken on line 4—4 of Figure 3, and Figure 5 is a detail sectional view of an inclined platform attached to the truck.

Figure 1:
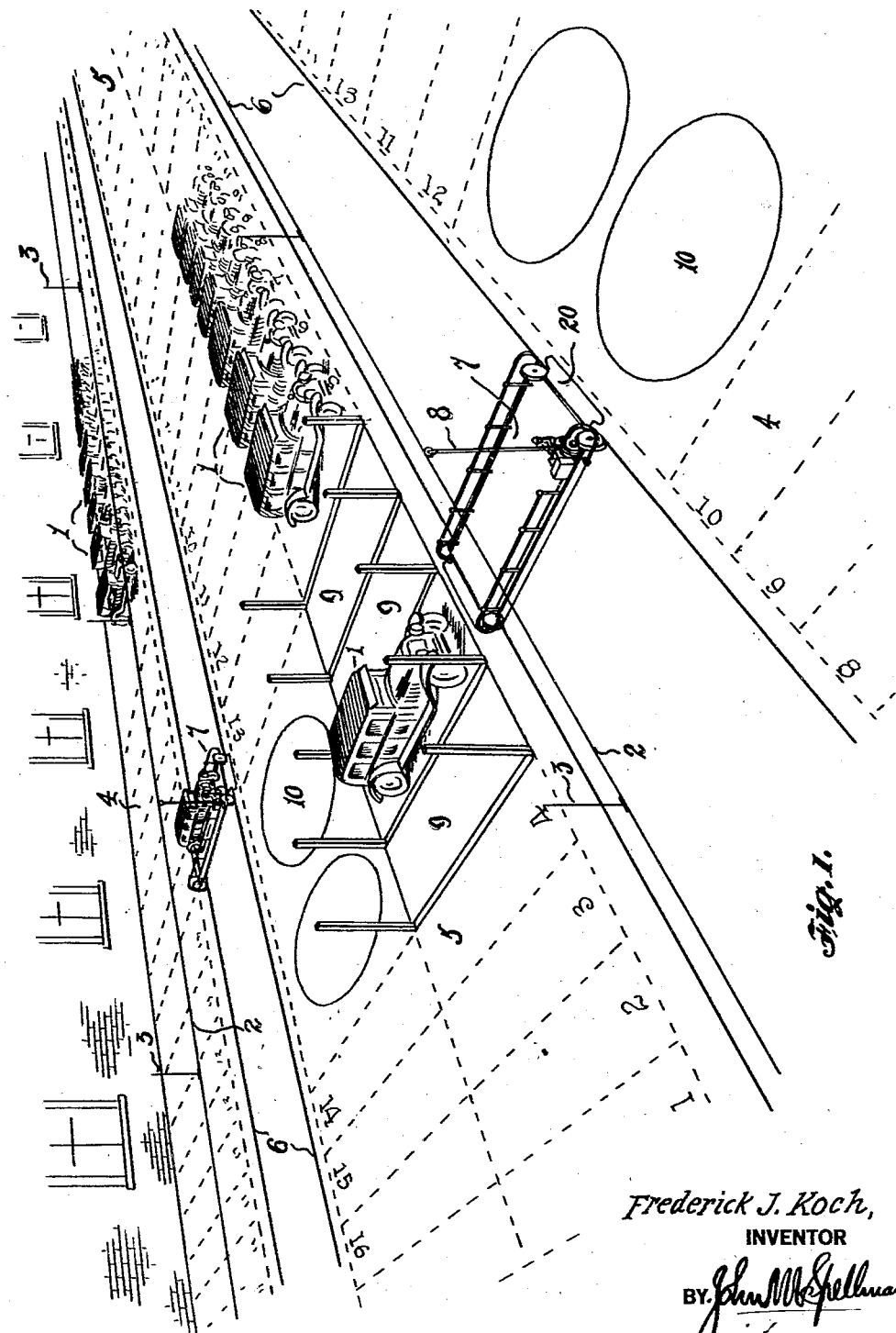
Figure 1 is an interior perspective view of a building, showing the lower floor and illustrating the arrangement and construction of the floor space, elevators, turn-tables, trolley line and truck, embodying the invention.

In carrying out the invention in its preferred form of construction and arrangement, a suitable building is constructed or provided and a concrete floor constructed from wall to wall. This flooring is numbered from 1 to as many spaces as necessary as illustrated by the numerals and as indicated by the dotted lines, such lines being only for the purpose in the drawing of illustrating the spaced outline of a vehicle or vehicles 1—1.

An overhead trolley line 2 is suspended from the ceiling by the supports 3—3. Between the wall spaces 4 on either side of the building and the center spaces 5 are trackways 6—6 for a trolley truck 7 with trolley pole 8. This may be a circular track or two tracks as preferred. The description in detail of the truck will be given hereinafter.

In the center of the floor are several elevators 9—9 arranged so that the truck may load or unload a vehicle therefrom for movement to or from an upper floor.

On each side of the elevators are turntables 10—10, circular in shape—the drawing being in perspective, however, they appear oval.

On Sheet 2 of the drawing and in Figures 2 to 5 thereof are illustrated the trolley truck for moving the motor vehicles in the building. This truck is of sufficient dimensions as to easily accommodate a vehicle and consists of a floor 11 with I-beam supports 12—12 and wheels 13—13 on each end, the truck floor being under-slung and supported on the axles 14—14 in bearings 15—15. Railings 16—16 are provided as shown with braced parts 17—17. The truck is also provided with a motor 18 and a controller 19.

The truck has at each end an inclined platform 20 for entrance and exit of the vehicle. It will be seen in Figures 3 and 4 that the platform projects laterally beyond its central part and is provided with hinges 21 and a spring 22, the outer edge being free from the floor, except when a vehicle is moving upon or away from the truck, the spring retracting the platform to normal clear position from the floor.

From the above it will be obvious that the vehicles may be transferred to and from the stalls or numbered parking spaces easily and quickly and quickly headed in the proper direction by means of the turn-tables. The truck will also enable the vehicles to be transferred to the elevators for transporting them to a higher floor when desired. It will also be evident that the vehicles may be parked with ease and convenience.

It should be understood that the upper floors may have the same arrangement as the lower floors and also that the arrangement and construction may be modified and varied in keeping with the following claim:

In a vehicle parking location, a floor having spaced parallel track ways, a transfer truck for each of said track ways, parking spaces arranged longitudinally of areas between the track ways, elevators arranged at certain points in said areas to transfer vehicles from and to the floor, turntables disposed at opposite sides of the elevators to receive the cars, one of said track ways being positioned between the elevators and the turn tables at one side of the elevators.

In testimony whereof I have signed my name to this specification.

FREDERICK J. KOCH.